US009752498B2

(12) United States Patent
Miyagi

(10) Patent No.: US 9,752,498 B2
(45) Date of Patent: Sep. 5, 2017

(54) OUTBOARD MOTOR

(71) Applicant: YAMAHA HATSUDOKI KABUSHIKI KAISHA, Iwata-shi, Shizuoka (JP)

(72) Inventor: Yuta Miyagi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/055,651

(22) Filed: Feb. 29, 2016

(65) Prior Publication Data

US 2016/0356214 A1 Dec. 8, 2016

(30) Foreign Application Priority Data

Jun. 3, 2015 (JP) .................. 2015-113171

(51) Int. Cl.
F02B 61/04 (2006.01)
F02M 37/00 (2006.01)
B63H 20/00 (2006.01)
F02M 55/02 (2006.01)
F02M 39/02 (2006.01)
F02M 55/00 (2006.01)
F02B 23/10 (2006.01)
F02B 75/12 (2006.01)

(52) U.S. Cl.
CPC ......... *F02B 61/045* (2013.01); *B63H 20/001* (2013.01); *F02B 23/101* (2013.01); *F02M 37/0017* (2013.01); *F02M 39/02* (2013.01); *F02M 55/004* (2013.01); *F02M 55/005* (2013.01); *F02M 55/025* (2013.01); *F02B 2023/102* (2013.01); *F02B 2075/125* (2013.01); *F02M 2200/857* (2013.01); *Y02T 10/123* (2013.01); *Y02T 10/125* (2013.01)

(58) Field of Classification Search
CPC .. B63H 20/00; B63H 20/001; B63H 2020/00; F02B 61/045; F02M 39/02; F02M 55/025; F02M 37/0017
USPC .............................................. 440/88 R, 88 F
See application file for complete search history.

(56) References Cited

U.S. PATENT DOCUMENTS

| 5,915,363 A * | 6/1999 | Iwata ..................... F02B 61/045 123/497 |
| 2013/0133622 A1* | 5/2013 | Ishiki ..................... F02M 55/02 123/456 |
| 2013/0157533 A1* | 6/2013 | Kato .................... B63H 20/245 440/88 F |

FOREIGN PATENT DOCUMENTS

JP   2013-113131 A   6/2013

* cited by examiner

*Primary Examiner* — Daniel V Venne
(74) *Attorney, Agent, or Firm* — Keating and Bennett, LLP

(57) ABSTRACT

An outboard motor includes a cylinder block, a cylinder head unit, a delivery pipe, a plurality of injectors, a fuel pump, and a fuel pipe. The cylinder block includes a plurality of cylinders. The cylinder head unit is connected to the cylinder block. The delivery pipe is attached to the cylinder head unit. The injectors are attached to the delivery pipe. The fuel pump is attached to the cylinder head unit. The fuel pipe is attached to the delivery pipe and the fuel pump. A first attachment direction of attaching the fuel pump to the cylinder head unit is parallel or substantially parallel to a second attachment direction of attaching the fuel pipe to the delivery pipe.

14 Claims, 6 Drawing Sheets

OUTBOARD MOTOR

BACKGROUND OF THE INVENTION

1. Field of the Invention

The present invention relates to an outboard motor.

2. Description of the Related Art

Fuel supply devices for engines, equipped with a delivery pipe, a fuel pump, and a fuel pipe, are known (see Japan Laid-open Patent Application Publication No. 2013-113131). The delivery pipe and the fuel pump are attached to a cylinder head unit, and the fuel pipe is attached to the delivery pipe and the fuel pump.

However, in the fuel supply device disclosed in Japan Laid-open Patent Application Publication No. 2013-113131, the direction of attaching the fuel pump to the cylinder head unit is approximately perpendicular to the direction of attaching the fuel pipe to the delivery pipe. Therefore, the fuel pipe cannot be detached from the delivery pipe while being attached to the fuel pump. This results in an increase in the number of steps required for maintenance of the delivery pipe.

SUMMARY OF THE INVENTION

In view of the above problems, preferred embodiments of the present invention provide an outboard motor in which enhanced maintenance performance is achieved for a delivery pipe.

An outboard motor according to a preferred embodiment of the present invention includes a cylinder block, a cylinder head unit, a delivery pipe, a plurality of injectors, a fuel pump, and a fuel pipe. The cylinder block includes a plurality of cylinders. The cylinder head unit is connected to the cylinder block. The delivery pipe is attached to the cylinder head unit. The plurality of injectors are attached to the delivery pipe. The fuel pump is attached to the cylinder head unit. The fuel pipe is attached to the delivery pipe and the fuel pump. A first attachment direction of attaching the fuel pump to the cylinder head unit is parallel or substantially parallel to a second attachment direction of attaching the fuel pipe to the delivery pipe.

According to the preferred embodiments of the present invention, it is possible to provide an outboard motor in which enhanced maintenance performance is achieved for the delivery pipe.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
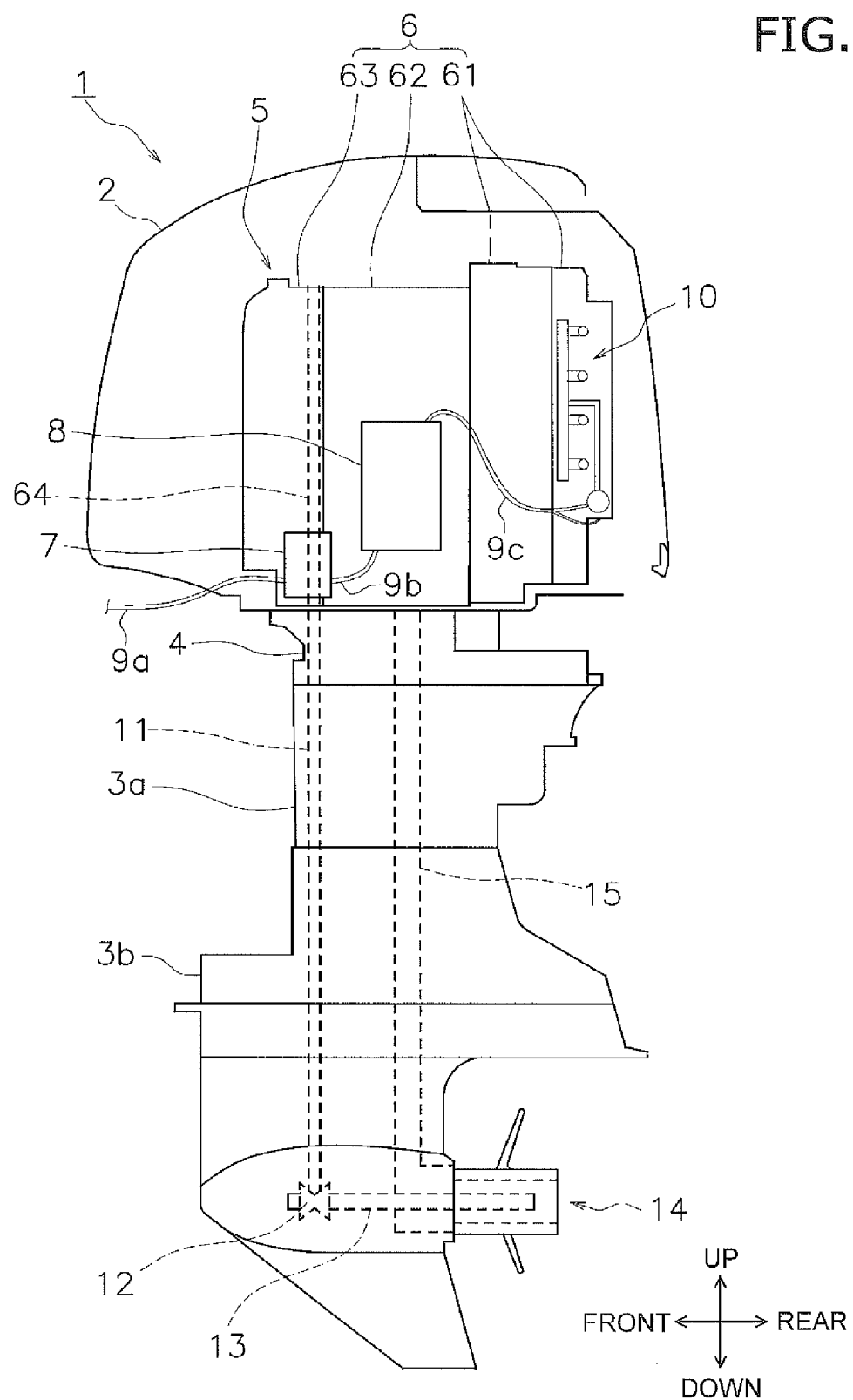
FIG. 1 is a schematic side view of a construction of an outboard motor.

An outboard motor 1 according to a preferred embodiment of the present invention is an outboard motor attachable to a vessel body through a suspension device. FIG. 1 is a schematic side view of a construction of the outboard motor 1.

As shown in FIG. 1, the outboard motor 1 includes an engine cover 2, an upper casing 3a, a lower casing 3b, an exhaust guide 4, and an engine unit 5.

The engine cover 2, the upper casing 3a, and the engine unit 5 are fixed to the exhaust guide 4. The engine cover 2 is disposed over the exhaust guide 4. The upper casing 3a is disposed under the exhaust guide 4. The lower casing 3b is disposed under the upper casing 3a. In the present preferred embodiment, the engine cover 2, the upper casing 3a, the lower casing 3b, and the exhaust guide 4 define a housing of the outboard motor 1.

The engine unit 5 is disposed inside the engine cover 2. The engine unit 5 includes an engine 6, a low pressure pump 7, an internal fuel tank 8, first to third fuel hoses 9a to 9c, and a fuel supply device 10.

The engine 6 is preferably an eight-cylinder V engine (V8 engine) of a vertical mount type. The engine 6 includes a cylinder head unit 6, a cylinder block 62, and a crank case 63. The cylinder head unit 61 is connected to the rear side of the cylinder block 62. The cylinder head unit 61 and the cylinder block 62 define a V bank. The crank case 63 is connected to the front side of the cylinder block 62. The crank case 63 accommodates a crankshaft 64 in the interior thereof. The crankshaft 64 extends in the vertical direction.

The low pressure pump 7 is connected to an external fuel tank (not shown in the drawings) disposed in the vessel body through the first fuel hose 9a. The low pressure pump 7 is connected to the internal fuel tank 8 through the second fuel hose 9b. The low pressure pump 7 supplies fuel from the external fuel tank to the internal fuel tank 8.

The internal fuel tank 8 stores the fuel supplied by the low pressure pump 7. The internal fuel tank 8 is connected to the fuel supply device 10 through the third fuel hose 9c. The construction of the fuel supply device 10 will be described below.

As shown in FIG. 1, the outboard motor 1 further includes a drive shaft 11, a bevel gear 12, a propeller shaft 13, a propeller 14, and an exhaust pathway 15.

The drive shaft 11 extends in the vertical direction in the interiors of the upper casing 3a and the lower casing 3b. The upper end of the drive shaft 11 is coupled to the lower end of the crankshaft 64 of the engine 6. The lower end of the drive shaft 11 is coupled to the front end of the propeller shaft 13 through the bevel gear 12. The propeller shaft 13 extends in the back-and-forth direction in the interior of the lower casing 3b. The rear end of the propeller shaft 13 protrudes from the lower casing 3b and is coupled to the propeller 14. The propeller 14 is rotated together with the propeller shaft 13. The exhaust pathway 15 extends from the engine 6 to the interior of the propeller 14 through the interiors of the exhaust guide 4, the upper casing 3a, and the lower casing 3b.

Figure 2:
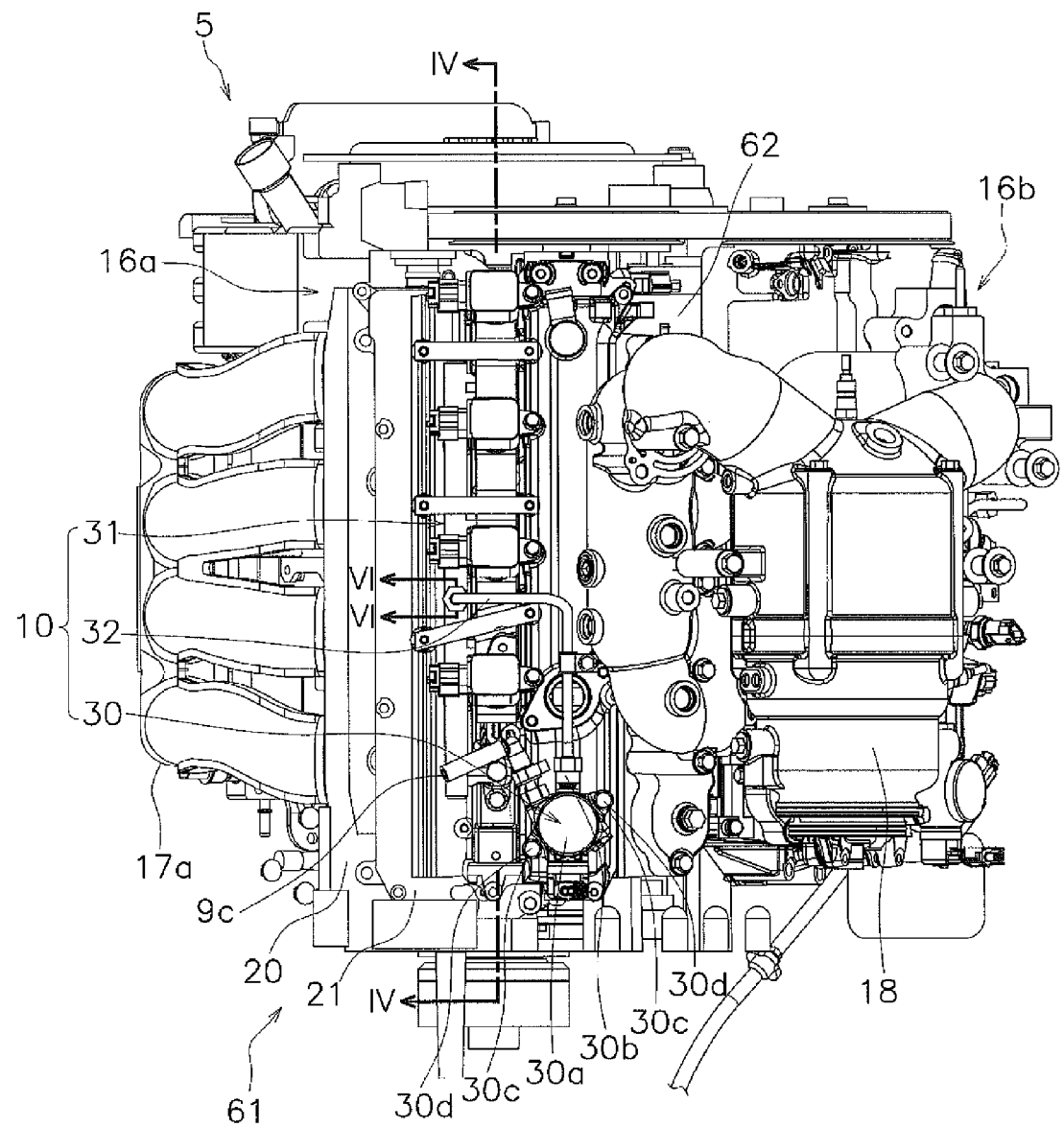
FIG. 2 is a left rear side view of an engine.
Figure 3:
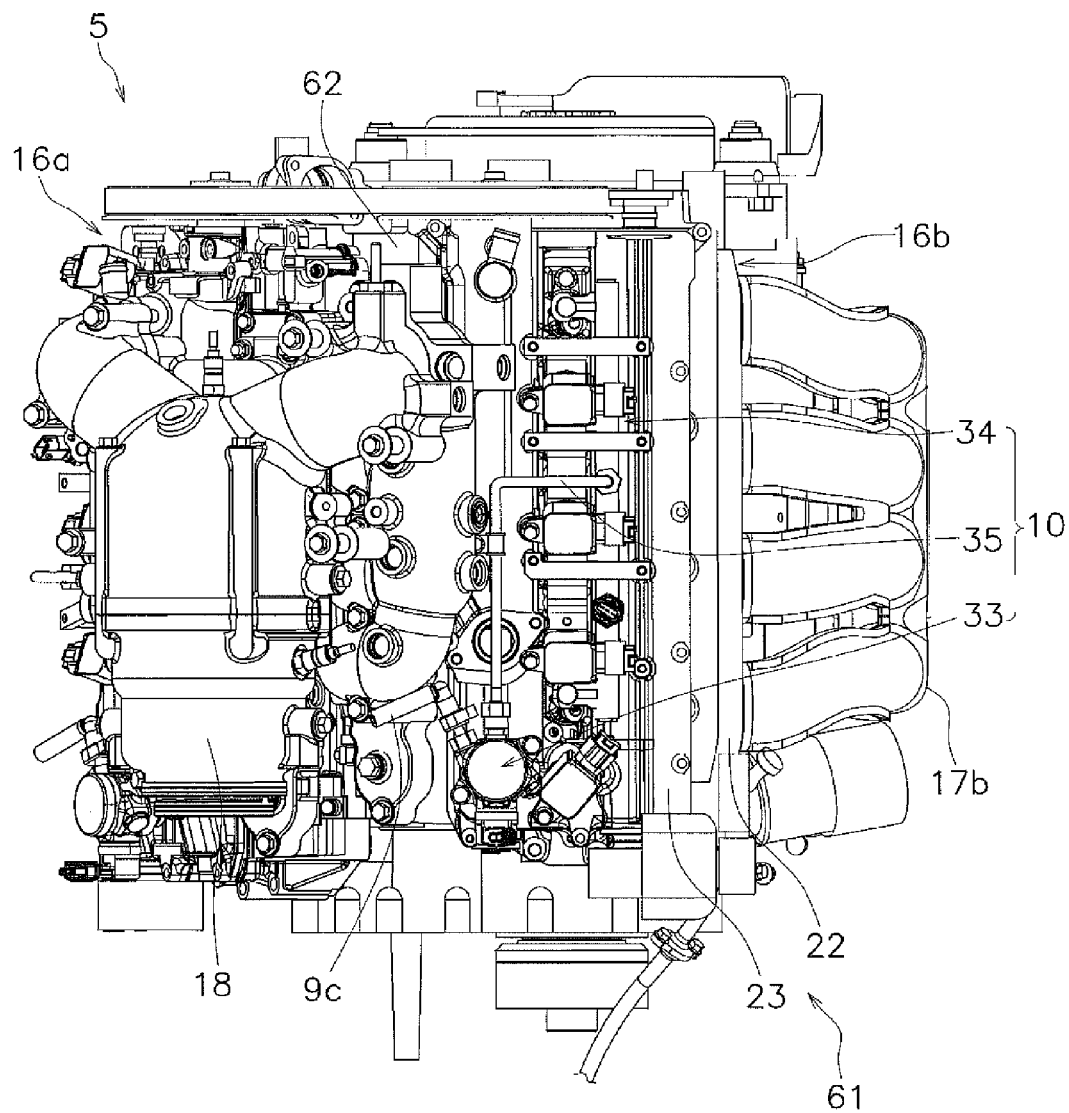
FIG. 3 is a right rear side view of the engine.
Figure 4:
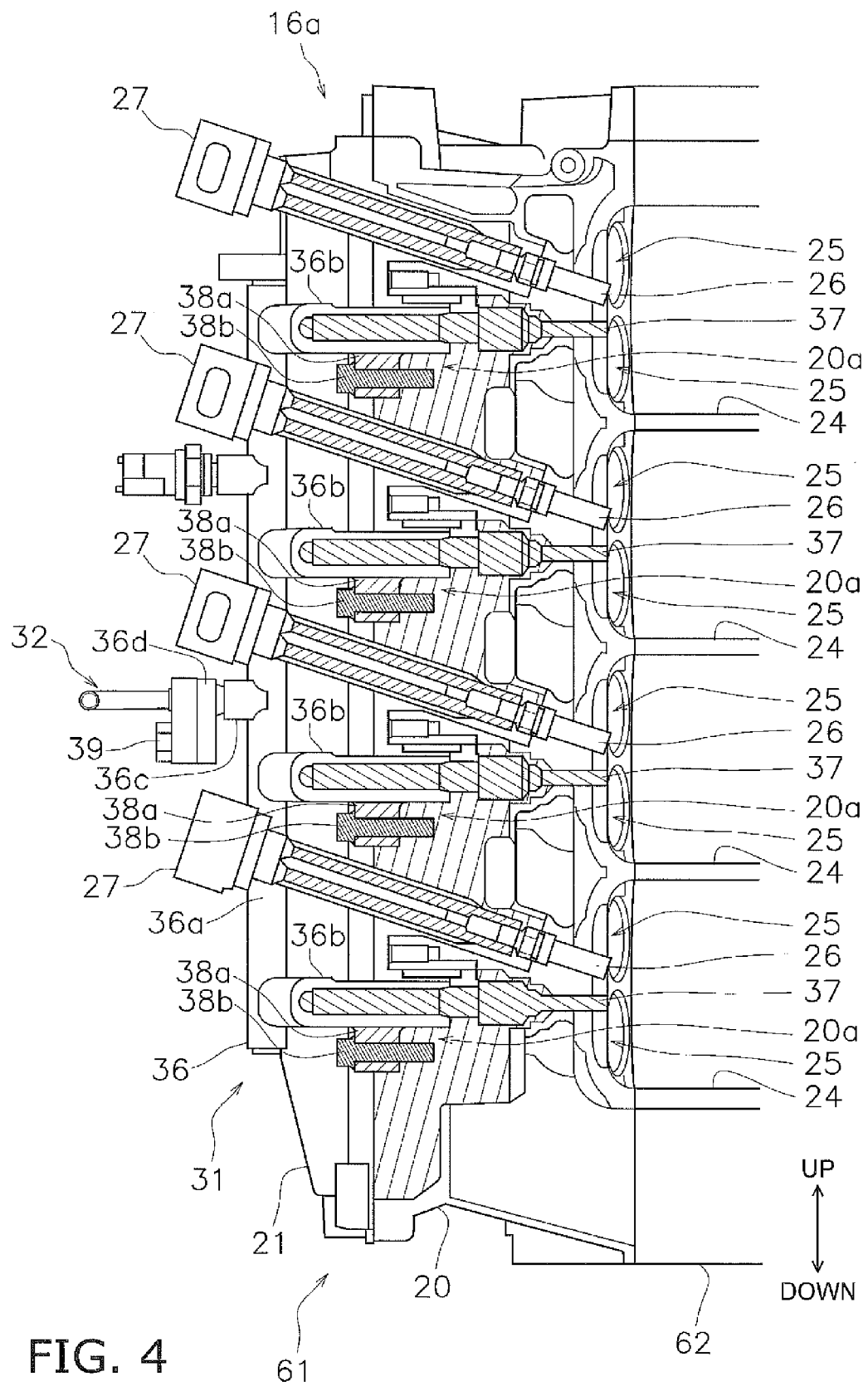
FIG. 4 is a cross-sectional view of FIG. 2 taken along line IV-IV.

Next, the constructions of the engine 6 and the fuel supply device 10 will be described. FIG. 2 is a left rear side view of the engine 6. FIG. 3 is a right rear side view of the engine 6. FIG. 4 is a cross-sectional view of FIG. 2 taken along line IV-IV.

The engine 6 includes a first bank 16a, a second bank 16b, a first intake manifold 17a, a second intake manifold 17b, and an exhaust manifold 18. The first bank 16a and the second bank 16b include the cylinder head unit 61 and the cylinder block 62. The cylinder head unit 61 includes a first cylinder head 20, a first cylinder head cover 21, a second cylinder head 22, and a second cylinder head cover 23.

The first bank 16a includes the left half portion of the cylinder block 62, the first cylinder head 20, and the first cylinder head cover 21. The second bank 16b includes the right half portion of the cylinder block 62, the second cylinder head 22, and the second cylinder head cover 23. The first bank 16a and the second bank 16b are disposed in a V shape when the crankshaft 64 is seen from the vertical direction (e.g., from above).

The first intake manifold 17a is disposed on the outside of the first cylinder head 20. The first intake manifold 17a is connected to the first cylinder head 20. The second intake manifold 17b is disposed on the outside of the second cylinder head 22. The second intake manifold 17b is connected to the second cylinder head 22.

The exhaust manifold 18 is connected to the first cylinder head 20 and the second cylinder head 22. The exhaust manifold 18 is disposed in the V bank defined between the first bank 16a and the second bank 16b.

As shown in FIG. 4, the first bank 16a includes four cylinders 24, eight intake ports 25, eight exhaust ports (not shown in the drawing), four spark plugs 26, and four ignition coils 27. The four cylinders 24 are provided in the interior of the left half portion of the cylinder block 62 and the interior of the first cylinder head 20. Each of the four cylinders 24 includes a combustion chamber in the interior thereof. The four cylinders 24 are aligned in the vertical direction. Each cylinder 24 is provided with two intake ports 25, two exhaust ports, and one spark plug 26. The ignition coils 27 are respectively connected to the spark plugs 26. The tip of each spark plug 26 is exposed to the interior of the combustion chamber of each cylinder 24. The second bank 16b is preferably constructed similarly to the first bank 16a.

As shown in FIGS. 2 and 4, the fuel supply device 10 includes a first fuel pump 30, a first fuel delivery assembly 31, a first fuel pipe 32, a second fuel pump 33, a second fuel delivery assembly 34, and a second fuel pipe 35.

The first fuel pump 30 is attached to the first cylinder head cover 21. The first fuel pump 30 is connected to the internal fuel tank 8 (see FIG. 1) through the third fuel hose 9c. The first fuel pump 30 is a high pressure pump. The first fuel pump 30 pressurizes the fuel stored in the internal fuel tank 8 and transfers the pressurized fuel to the first fuel delivery assembly 31.

The first fuel pump 30 is connected to the first fuel delivery assembly 31 through the first fuel pipe 32. The first fuel pump 30 includes a body 30a, a fuel pipe attachment portion 30b, and a pair of fixtures 30c. The first fuel pipe 32 is attached to the fuel pipe attachment portion 30b. The pair of fixtures 30c is preferably fixed to the first cylinder head cover 21 by a pair of bolts 30d, for example, also referred to as "fixture pieces."

The first fuel delivery assembly 31 is attached to the first cylinder head 20. As shown in FIG. 4, the first fuel delivery assembly 31 includes a delivery pipe 36 and four injectors 37.

The delivery pipe 36 includes a main pipe 36a, four branch pipes 36b, and a fuel pipe attachment portion 36c. The main pipe 36a is disposed laterally to the four ignition coils 27. The main pipe 36a extends in the vertical direction. The four branch pipes 36b are aligned in the vertical direction. The four branch pipes 36b are connected to the main pipe 36a. The branch pipes 36b respectively extend from the main pipe 36a toward the cylinders 24. The injectors 37 are respectively attached to the tips of the branch pipes 36b. The branch pipes 36b are preferably fixed to branch pipe fixture bosses 20a of the first cylinder head 20 by bolts 38b, for example, respectively inserted into fixtures 38a laterally protruding from the branch pipes 36b.

The fuel pipe attachment portion 36c is connected to the main pipe 36a. The fuel pipe attachment portion 36c is disposed in the middle of the main pipe 36a. The first fuel pipe 32 is detachably attached to the fuel pipe attachment portion 36c. The fuel pipe attachment portion 36c includes a fuel pipe fixture boss 36d to attach the first fuel pipe 32. The fuel pipe fixture boss 36d includes a bolt hole into which a bolt 39, for example, is screwed and fixed.

The four injectors 37 are respectively attached to the four branch pipes 36b. The injectors 37 are inserted into the first cylinder head 20. The injectors 37 are aligned with the spark plugs 26 in the vertical direction. The tip of each injector 37 is exposed to the interior of the combustion chamber of each cylinder 24. The tip of each injector 37 is disposed adjacently to the tip of each spark plug 26. Each injector 37 is center mounted to each cylinder 24. Each injector 37 is located in approximately the center of each cylinder 24 in a view from the axial direction of each cylinder 24. The tip of each injector 37 is disposed in approximately the middle of the two intake ports 25 and the two exhaust ports.

The first fuel pipe 32 is attached to the first fuel pump 30 and the first fuel delivery assembly 31. A structure to attach the first fuel pipe 32 to the first fuel delivery assembly 31 is preferably different from that to attach the first fuel pipe 32 to the first fuel pump 30. The first fuel pipe 32 is preferably not detachable from the first fuel pump 30 once attached thereto, but is detachable from the first fuel delivery assembly 31 once attached thereto.

Figure 5:
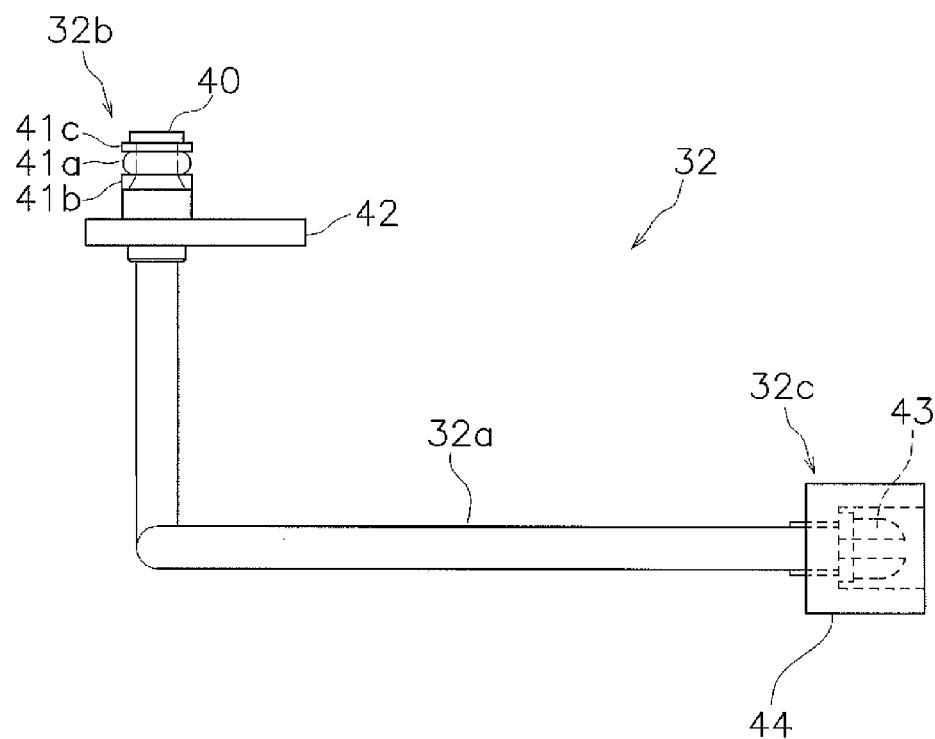
FIG. 5 is a side view of a first fuel pipe.

FIG. 5 is a side view of the first fuel pipe 32. The first fuel pipe 32 includes a pipe body 32a, a first end 32b, and a second end 32c.

The pipe body 32a is preferably made of a metallic member having a slight elasticity. The shape and size of the pipe body 32a is arbitrarily changed in accordance with the positional relationship between the first fuel pump 30 and the first fuel delivery assembly 31.

The first end 32b is detachably attached to the delivery pipe 36. The first end 32b includes a first joint pipe 40, three elastic seal members 41a, 41b, and 41c (each of which is an exemplary "first elastic seal member") and a fixture 42. The first joint pipe 40 is connected to one end of the pipe body 32a. The first joint pipe 40 preferably has a tubular shape, for example. The three elastic seal members 41a, 41b and 41c are attached to the tip of the first joint pipe 40. Each of the three elastic seal members 41a, 41b and 41c preferably has an annular shape, for example. In the present preferred embodiment, the elastic seal member 41a is an O-ring made of rubber. Each of the elastic seal members 41b and 41c is a gasket made preferably made of metal. The elastic seal member 41a is disposed between the elastic seal member 41b and the elastic seal member 41c. It should be noted that the materials, shapes, and sizes of the three elastic seal members 41a, 41b and 41c is arbitrarily changed. The fixture 42 is fixed to the base of the first joint pipe 40. The fixture 42 includes a bolt hole.

Figure 6:
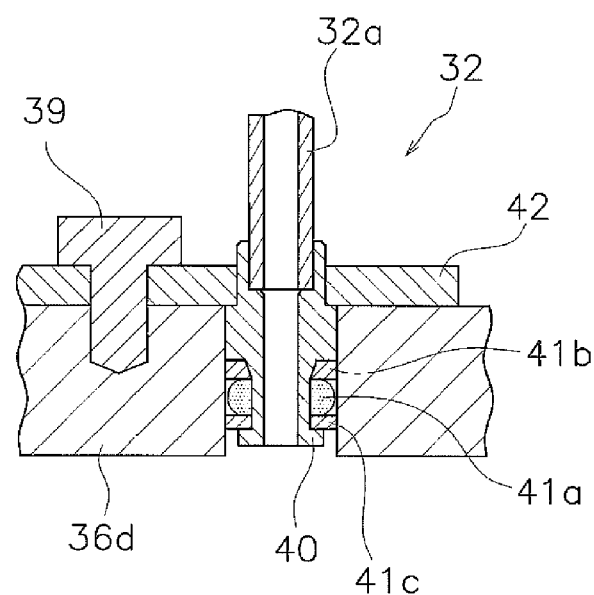
FIG. 6 is a cross-sectional view of FIG. 2 taken along line VI-VI.

FIG. 6 is a cross-sectional view of FIG. 2 taken along line VI-VI. As shown in FIG. 6, the first joint pipe 40 is inserted into the fuel pipe fixture boss 36d of the delivery pipe 36. Liquid tightness and gas tightness are reliably achieved between the first fuel pipe 32 and the delivery pipe 36 by the three elastic seal members 41a, 41b, and 41c. Metal-tometal contact is not established between the first joint pipe 40 and the fuel pipe attachment portion 36c. Therefore, the tip of the first joint pipe 40 is in a reusable state without being plastically deformed. The first joint pipe 40 is detachable from the delivery pipe 36 once attached thereto. The fixture 42 includes the bolt hole through which the bolt 39 is inserted. The fixture 42 is preferably fixed to the fuel pipe fixture boss 36d by the bolt 39, for example.

The second end 32c is preferably non-detachably attached to the first fuel pump 30. The second end 32c includes a second joint pipe 43 and a union nut 44. The second joint pipe 43 is connected to the other end of the pipe body 32a. The second joint pipe 43 preferably has a tubular shape, for example. The second joint pipe 43 is inserted into the fuel pipe attachment portion 30b (see FIG. 2) of the first fuel pump 30. The tip of the second joint pipe 43 contacts the fuel pipe attachment portion 30b, and thus, metal-to-metal contact is established between the tip of the second joint pipe 43 and the fuel pipe attachment portion 30b. Therefore, the tip of the second joint pipe 43 is plastically deformed and is in a non-reusable state. The second joint pipe 43 is preferably not detachable from the fuel pipe attachment portion 30b once attached thereto. The union nut 44 is rotatably attached to the base of the second joint pipe 43. The union nut 44 is screwed and fixed onto the fuel pipe attachment portion 30b.

The second fuel pump 33 is preferably constructed similarly to the first fuel pump 30. The second fuel delivery assembly 34 is preferably constructed similarly to the first fuel delivery assembly 31. The second fuel pipe 35 is preferably similarly constructed to the first fuel pipe 32.

Figure 7:
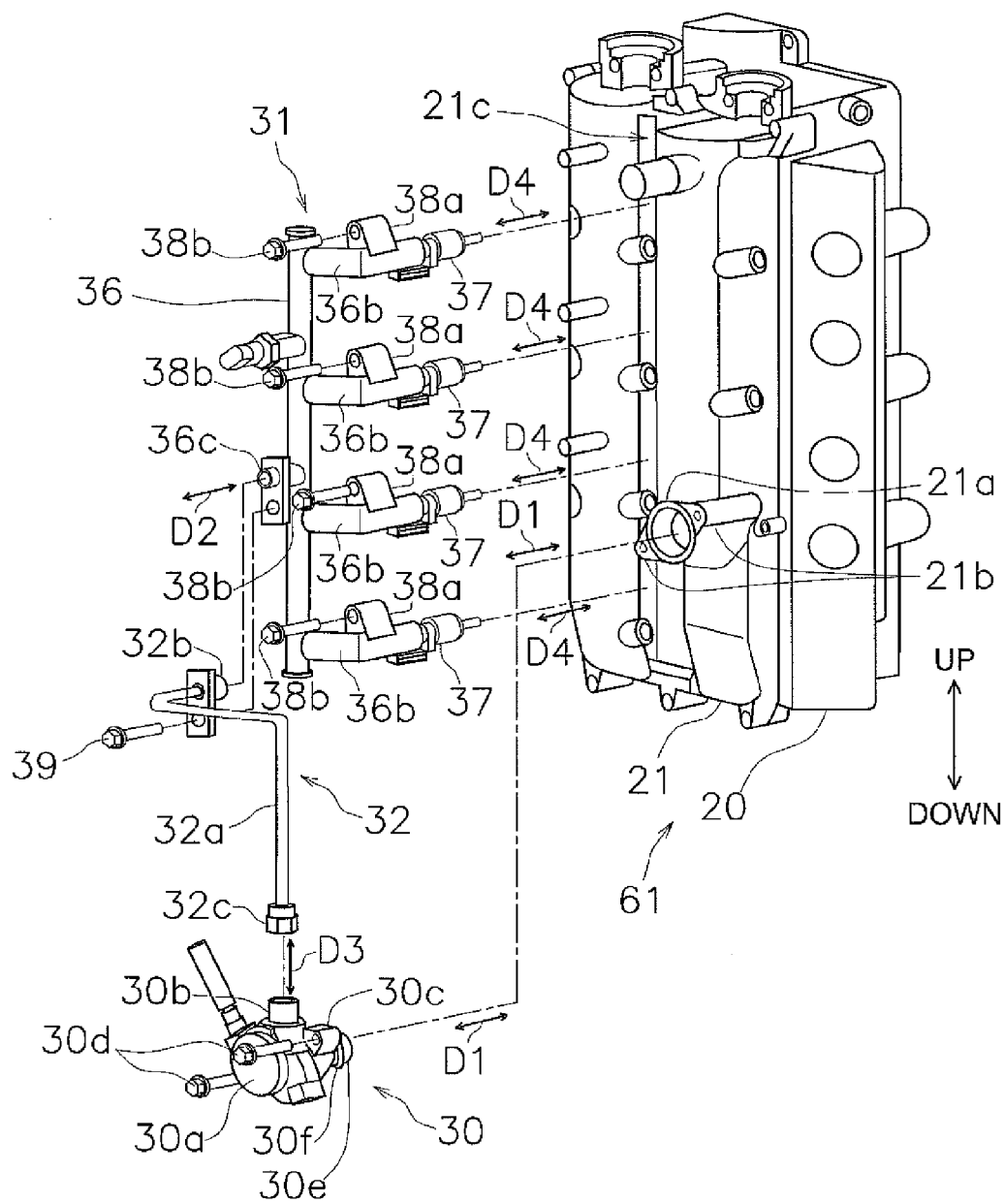
FIG. 7 is an exploded perspective view for explaining a structure to attach a fuel supply device to a cylinder head unit.

Next, a structure that attaches the fuel supply device 10 to the cylinder head unit 61 will be explained. FIG. 7 is an exploded perspective view for explaining the structure that attaches the fuel supply device 10 to the cylinder head unit 61.

The first fuel pump 30 is moved in a first attachment direction D1 so as to be attached to the first cylinder head cover 21. The body 30a of the first fuel pump 30 is moved in the first attachment direction D1 so as to be inserted into a recess 21a provided on the first cylinder head cover 21. At this time, a boss 30e of the body 30a is fitted into the recess 21a, and simultaneously, an elastic seal member 30f (exemplary "third elastic seal member") attached to the boss 30e is tightly adhered to the inner peripheral surface of the recess 21a. Thus, the body 30a is detachably attached to the first cylinder head cover 21. It is preferred to prepare an O-ring made of rubber, for example, as the elastic seal member 30f. The elastic seal member 30f decreases vibrations of the engine 6, and simultaneously, seals the boss 30e in the recess 21a.

The pair of fixtures 30c of the first fuel pump 30 is moved in the first attachment direction D1 so as to contact a pair of pump fixture bosses 21b mounted to the first cylinder head cover 21. The pair of bolts 30d of the first fuel pump 30 is moved in the first attachment direction D1 so as to be inserted into a pair of bolt holes provided in the pump fixture bosses 21b.

The first fuel pipe 32 is moved in a second attachment direction D2 so as to be attached to the delivery pipe 36. The first end 32b of the first fuel pipe 32 is moved in the second attachment direction D2 so as to be detachably attached to the fuel pipe attachment portion 36c of the delivery pipe 36.

The first fuel pipe 32 is moved in a third attachment direction D3 so as to be attached to the first fuel pump 30. The second end 32c of the first fuel pipe 32 is moved in the third attachment direction D3 so as to be non-detachably attached to the fuel pipe attachment portion 30b of the first fuel pump 30.

The first fuel delivery assembly 31 is moved in a fourth attachment direction D4 so as to be attached to the first cylinder head 20. The four branch pipes 36b of the delivery pipe 36 are moved in the fourth attachment direction D4 so as to be inserted into an opening 21c provided in the first cylinder head cover 21. The fixtures 38a of the branch pipes 36b are moved in the fourth attachment direction D4 so as to contact the branch pipe fixture bosses 20a (see FIG. 4) of the first cylinder head 20. The bolts 38b, inserted through the fixtures 38a of the branch pipes 36b, are moved in the fourth attachment direction D4 so as to be inserted into bolt holes of the branch pipe fixture bosses 20a. The injectors 37 are moved in the fourth attachment direction D4 so as to be inserted into the cylinders 24 of the first cylinder head 20.

In the present preferred embodiment, the first attachment direction D1 is parallel or substantially parallel to the second attachment direction D2. The first attachment direction D1 and the second attachment direction D2 are parallel or substantially parallel to the axial direction of each cylinder 24. The third attachment direction D3 is perpendicular or substantially perpendicular to the first attachment direction D1 and the second attachment direction D2. The fourth attachment direction D4 is parallel or substantially parallel to the first attachment direction D1 and the second attachment direction D2. The fourth attachment direction D4 is parallel or substantially parallel to the axial direction of each cylinder 24.

Therefore, the first fuel pump 30 and the first fuel pipe 32 are able to be detached from the cylinder head unit 61 by detaching the pair of bolts 30d of the first fuel pump 30 from the pair of pump fixture bosses 21b of the first cylinder head cover 21 and simultaneously detaching the first end 32b of the first fuel pipe 32 from the fuel pipe attachment portion 36c of the delivery pipe 36, and then, by moving the first fuel pump 30 and the first fuel pipe 32 in the first attachment direction D1, with the first fuel pump 30 and the first fuel pipe 32 being coupled to each other. Thus, maintenance (e.g., replacement) of the delivery pipe 36 is easily and conveniently performed.

Additionally, when reattaching the first fuel pump 30 and the first fuel pipe 32 to the cylinder head unit 61, it is required to move the first fuel pump 30 and the first fuel pipe 32 in the first attachment direction D1 with both being coupled to each other, and subsequently, it is required to screw and fix the pair of bolts 30d of the first fuel pump 30 to the pair of pump fixture bosses 21b of the first cylinder head cover 21, and simultaneously, to attach the first end 32b of the first fuel pipe 32 to the fuel pipe attachment portion 36c of the delivery pipe 36.

Preferred embodiments of the present invention have been described above. However, the present invention is not limited to the preferred embodiments described above, and a variety of changes can be made without departing from the scope of the present invention.

The engine 6 described above is preferable a V8 engine of a vertical mount type. However, the construction of the engine 6 is not limited to this. The engine 6 may be horizontally mounted. The engine 6 may be an inclined engine, a horizontally opposed engine, or so forth. The engine 6 may include seven or less cylinders 24, or alternatively, may include nine or more cylinders 24.

The first attachment direction D1 and the second attachment direction D2 are preferably parallel or substantially parallel to the axial direction of each cylinder 24. However, the first attachment direction D1 and the second attachment direction D2 may be arranged obliquely or orthogonally to the axial direction of each cylinder 24.

The third attachment direction D3 is arranged perpendicular or substantially perpendicular to the first attachment direction D1 and the second attachment direction D2. However, the third attachment direction D3 may be parallel, substantially parallel, or oblique to the first attachment direction D1 and the second attachment direction D2.

The fourth attachment direction D4 is preferably parallel or substantially parallel to the first attachment direction D1 and the second attachment direction D2. However, the fourth attachment direction D4 may be arranged obliquely or orthogonally to the first attachment direction D1 and the second attachment direction D2.

The fourth attachment direction D4 is preferably parallel or substantially parallel to the axial direction of each cylinder 24. However, the fourth attachment direction D4 may be arranged obliquely or orthogonally to the axial direction of each cylinder 24.

The first fuel pipe 32 is preferably not detachable from the first fuel pump 30 once attached thereto. However, the first fuel pipe 32 may be detachable from the first fuel pump 30 once attached thereto. In this construction, the second end 32c of the first fuel pipe 32 is at least required to be constructed similarly to the first end 32b. In other words, the first fuel pipe 32 is attachable to the first fuel pump 30 through an elastic seal member (exemplary "second elastic seal member"). It is preferred to provide an O-ring made of rubber as the elastic seal member. However, the elastic seal member is not limited to an O-ring.

The first fuel pump 30 is preferably attached to the first cylinder head cover 21. However, the first fuel pump 30 may be attached to the first cylinder head 20.

The first fuel delivery assembly 31 is preferably attached to the first cylinder head 20. However, the first fuel delivery assembly 31 may be attached to the first cylinder head cover 21.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   a cylinder block including a plurality of cylinders;
   a cylinder head unit connected to the cylinder block;
   a delivery pipe attached to the cylinder head unit;
   a plurality of injectors attached to the delivery pipe;
   a fuel pump attached to the cylinder head unit; and
   a fuel pipe attached to the delivery pipe and to the fuel pump; wherein
   a first attachment direction of attaching the fuel pump to the cylinder head unit is parallel or substantially parallel to a second attachment direction of attaching the fuel pipe to the delivery pipe.

2. The outboard motor according to claim 1, wherein each of the first and second attachment directions is parallel or substantially parallel to an axial direction of each of the plurality of cylinders.

3. The outboard motor according to claim 1, wherein each of the plurality of injectors is located in a middle or approximately a middle of each of the plurality of cylinders in a view seen from an axial direction of each of the plurality of cylinders.

4. The outboard motor according to claim 1, wherein the fuel pipe is detachable from the delivery pipe.

5. The outboard motor according to claim 4, wherein the fuel pipe is attached to the delivery pipe through an elastic seal.

6. The outboard motor according to claim 5, wherein the elastic seal includes an O-ring made of rubber.

7. The outboard motor according to claim 1, wherein the fuel pipe is detachable from the fuel pump.

8. The outboard motor according to claim 7, wherein the fuel pipe is attached to the fuel pump through an elastic seal.

9. The outboard motor according to claim 8, wherein the elastic seal includes an O-ring made of rubber.

10. The outboard motor according to claim 1, wherein the cylinder head unit includes a cylinder head and a head cover, the cylinder head is connected to the cylinder block, the head cover is connected to the cylinder head, and the fuel pump is fixed to the head cover by a fixture piece.

11. The outboard motor according to claim 10, wherein the head cover includes a recess, and the fuel pump includes a boss fitted to the recess through an elastic seal.

12. The outboard motor according to claim 11, wherein the elastic seal includes an O-ring made of rubber.

13. The outboard motor according to claim 1, wherein
   a first end of the fuel pipe includes a portion that is not plastically deformed and is attached to the delivery pipe; and
   a second end of the fuel pipe includes a portion that is plastically deformed and attached to the fuel pump.

14. The outboard motor according to claim 13, wherein the fuel pipe is attached to the delivery pipe through an elastic seal, and the fuel pipe is attached to the fuel pump by metal-to-metal contact.

* * * * *